Jan. 1, 1963

V. J. FRILETTE ETAL 3,071,434

PROCESS FOR MAKING CRYSTALLINE ZEOLITES

Filed Jan. 20, 1960

INVENTORS
Vincent J. Frilette
BY George T. Kerr

Raymond W. Barclay
ATTORNEY

Jan. 1, 1963 V. J. FRILETTE ETAL 3,071,434
PROCESS FOR MAKING CRYSTALLINE ZEOLITES
Filed Jan. 20, 1960 3 Sheets-Sheet 3

INVENTOR.
Vincent J. Frilette
George T. Kerr
BY
*Raymond W. Barclay*
ATTORNEY

United States Patent Office

3,071,434
Patented Jan. 1, 1963

3,071,434
PROCESS FOR MAKING CRYSTALLINE ZEOLITES
Vincent J. Frilette, Erlton, and George T. Kerr, Delaware Township, Camden County, N.J., assignors to Socony Mobil Oil Company, Inc., a corporation of New York
Filed Jan. 20, 1960, Ser. No. 3,574
6 Claims. (Cl. 23—113)

This invention relates to a process for synthesizing crystalline aluminosilicates having a zeolitic structure of rigid three-dimentsional network, uniform pore size and well-defined intra-crystalline dimensions such that only molecules of suitable size and shape may be transported in either direction between the exterior phase and the interior of the crystalline zeolite. Specifically, the present invention is directed to an improved method for the manufacture of a crystalline aluminosilicate molecular sieve type zeolite. In particular, the invention described herein relates to a continuous method for the manufacture of solid molecular sieve type aluminosilicates made up of porous crystals wherein the pores of the crystals are of uniform size and when in the form of sodium aluminosilicate are characterized by an effective pore size of approximately 4 Angstrom units.

As is well known, aluminosilicates of the molecular sieve type, are essentially dehydrated forms of crystalline zeolites containing varying quantities of sodium, calcium, and aluminum with or without other metals. All or a portion of the sodium or calcium ions normally contained in the molecular sieve structure may undergo exchange with a number of various other ions. The ions of sodium, calcium or metals in replacement thereof, silicon, aluminum and oxygen in these zeolites are arranged in the form of an aluminosilicate in a definite and consistent crystalline pattern. The structure contains a large number of small cavities, interconnected by a number of still smaller holes, which cavities and holes are precisely uniform in size.

At the present time, there are commercially available molecular sieves of the "A" series and of the "X" series. Molecular sieves of the "A" series include materials which, expressed in terms of oxides, have the following composition:

where "M" is a metal of groups I or II or a transition metal of the periodic table, hydrogen or ammonium, "$n$" represents the valence of "M" and "Y" may be any value up to about 6. A synthetic zeolite known as molecular sieve 4A is a crystalline sodium aluminosilicate having an effective pore diameter of about 4 angstroms. In the hydrated form, this material is chemically characterized by the unit cell formula:

The synthetic zeolite known as molecular sieve 5A is a crystalline aluminosilicate salt having channels about 5 angstroms in diameter and in which 4 or more of the 12 ions of sodium in the immediately above formula are replaced by calcium, it being understood that calcium replaces sodium in the ratio of one calcium ion for two sodium ions. A crystalline sodium aluminosilicate which has pores or channels of approximately 13 Angstrom units in diameter is also available commercially under the name of molecular sieve 13X. The letter "X" is used to distinguish the interatomic structure of this zeolite from that of the "A" crystals mentioned above. As prepared, the 13X material contains water and has the unit cell formula The synthetic zeolite known as molecular sieve 10X is acrystalline aluminosilicate having an effective pore diameter of about 10 Angstrom units in diameter and in which a substantial proportion of the sodium ions of the 13X materials have been replaced by calcium.

All of the foregoing molecular sieve materials have heretofore been produced in a batch type operation. Synthesis of the "A" series molecular sieves utilizing such a process is described in U.S. 2,882,243. Synthesis of the "X" series molecular sieves, is described in U.S. 2,882,244. These previously known methods have necessarily been carried out on a batch basis. This is not surprising in view of the complex structure of the crystals, which ordinarily requires a relatively long time to form from the highly disordered components disposed initially in random fashion throughout the solid and liquid phases of the reaction mixture. As will be realized, it is highly desirable to afford a method for manufacturing molecular sieve materials in a continuous manner, giving rise to a commercially more attractive operation and resulting in a greatly increased production of product within a given time.

It is accordingly the principal object of this invention to provide a method for increasing the rate of production of crystalline aluminosilicate molecular sieves. A further object is to provide a continuous process for the manufacture of molecular sieves. A still further object is the provision of a continuous method for synthesizing molecular sieves of the "A" series. A specific object of the invention is to afford a continuous process for the manufacture of molecular sieve 4A.

The above and other objects which will be apparent to those skilled in the art are achieved in accordance with the present invention wherein a process has been discovered for increasing the rate of production of molecular sieves of the "A" series. Such process permits manufacture of the "A" series molecular sieves in a continuous operation. The technique utilized in such process is surprisingly not applicable for synthesizing molecular sieves of the "X" series. The reason for this distinction is not fully understood, but would appear to be due to a difference in the mechanism of crystal growth for the two types of molecular sieves. It has been established in accordance with the present invention, that the introduction of a quantity of a molecular sieve of the "A" series to the initial reaction mixture utilized for the preparation of this type of molecular sieve serves to unexpectedly enhance and increase the rate of crystallization of molecular sieve product therein. In particular, it has been found that the introduction of a quantity of crystalline sodium aluminosilicate having a uniform pore structure made up of pores of about 4 Angstrom units in diameter, i.e. molecular sive 4A, to the reaction mixture utilized for the preparation of this molecular sieve brings about an unexpected increase in the rate of crystallization of desired molecular sieve product. Since molecular sieves of the "A" series are prepared initially in the sodium form of the crystal, the above procedure may be advantageously used to increase the rate of production of "A" series molecular sieves in general. The greatly increased rate of crystallization attained affords a continuous method for synthesis of 4A molecular sieve and the other "A" series molecular sieves.

In one embodiment, the present invention relates to an improvement in a method for preparing a crystalline aluminosilicate molecular sieve characterized by pores of a uniform size and having the formula:

where "M" represents at least one of the materials in the group consisting of hydrogen, ammonium, metals in groups I and II of the periodic table and the transition metals of the periodic table; "$n$" represents the valence of "M" and "Y" may be any value up to 6, involving the preparation of a sodium oxide-silica-alumina-water reaction mixture whose composition, expressed in terms of oxide-mole ratios, falls within the ranges:

maintaining the mixture at a temperature between about 20° C. and about 175° C. until crystals of sodium aluminosilicate having the above defined composition are formed, separating such crystals from the mother liquor and exchanging at least a portion of the sodium ions thereof with ions of "M," which improvement comprises introducing into the reaction mixture, from an external source, at a time prior to completion of the crystallization reaction, a sufficient quantity, generally at least about 1 percent of the ultimate weight of crystalline product of crystals of the above defined sodium aluminosilicate, to enhance the rate of crystallization occurring in said mixture.

In another embodiment, the present invention relates to a continuous method for synthesizing a solid sodium aluminosilicate molecular sieve made up of porous crystals wherein the pores of the crystals are of uniform size and have an effective pore size of about 4 Angstrom units which comprises continuously preparing a sodium oxide-silica-alumina-water reaction mixture having a composition expressed in terms of oxide-mole ratios falling within the following ranges:

maintaining the mixture at a temperature within the range from 20 to 175° C. until crystals, as above defined, are formed, continuously withdrawing a portion of the resulting crystal-containing slurry, continuously introducing the withdrawn portion to a fresh supply of the reaction mixture in a quantity sufficient to enhance the rate of crystallization occurring therein and continuously separating crystalline product from the remainder of the crystal-containing slurry.

In still another embodiment, the present invention relates to a continuous method for synthesizing a solid calcium aluminosilicate molecular sieve made up of porous crystals wherein the pores of the crystals are of uniform size and have a pore size of about 5 Angstrom units by continuously exchanging at least about 40 percent of the sodium ions of the crystalline sodium aluminosilicate produced as above with calcium ions.

Molecular sieves of the "A" series consist fundamentally of a three-dimensional structure of silica and alumina tetrahedra. The silicon and aluminum ions share oxygen atoms in such a manner that the ratio of atoms of oxygen to the total number of atoms of aluminum and silicon is equal to two. The electrovalence of the tetrahedra containing aluminum is balanced by the inclusion in the crystal of a cation, for example, an alkali metal or an alkaline earth metal cation. This equilibrium can be expressed by formula wherein the ratio of $Al_2$ to the number of various cations, such as Ca, Sr, Mg, $Na_2$, $K_2$ or $Li_2$ is equal to unity. One cation may be exchanged either in entirety or partially by another cation utilizing ion exchange techniques.

Such molecular sieves of the "A" series are characterized by compositions, expressed in terms of oxides as follows:

where "M" is hydrogen, ammonium, a metal of group I or II of the periodic table such as sodium, potassium, silver, cadmium, lithium, mercury, calcium, magnesium and strontium or a transition metal of the periodic table such as nickel, cobalt, platinum, chromium, iron, scandium, titanium, vanadium, manganese, yttrium, zirconium, niobium, molybdenum, ruthenium, rhodium, palladium, hafnium, tantalum, tungsten, rhenium osmium or iridium; "$n$" represents the valence of "M" and "Y" may be any value up to about 6. Such molecular sieves are prepared initially in the sodium form of the crystal. In general, the process of preparation involves heating, in aqueous solution, an appropriate mixture of oxides, or of materials whose chemical composition can be completely represented as a mixture of oxides $Na_2O$, $Al_2O_3$, $SiO_2$ and $H_2O$. The product, which crystallizes from this hot mixture is separated therefrom and water washed to remove excess alkali. After heating until dehydration is attained, the substance is ready for use.

Suitable reagents for the preparation of the sodium zeolite of the "A" series include silica sol, silica gel, silicic acid or sodium silicate as sources of silica. Alumina can be supplied by utilizing activated alumina, gamma alumina, alpha alumina, aluminum trihydrate or sodium aluminate. Sodium hydroxide is suitably used as the source of the sodium ion and in addition contributes to the regulation of the pH. The reaction solution has a composition, expressed as mixtures of oxides, within the following ranges: $SiO_2/Al_2O_3$ of 0.5 to 2.5, $Na_2O/SiO_2$ of 0.8 to 3.0 and $H_2O/Na_2O$ of 35 to 200. The above specified ratios and particularly the $SiO_2/Al_2O_3$ ratio would appear to be critical to the success of the present process since a composition, expressed as mixtures of oxides, within the following limits: $SiO_2/Al_2O_3$ of 3 to 5, $Na_2O/SiO_2$ of 1.2 to 1.5 and $H_2O/Na_2O$ of 35 to 200 of the type normally employed in preparation of molecular sieves of the "X" series did not respond to the seeding technique characterizing the reaction mixture utilized in the process of the present invention.

Such reaction mixture is placed in a suitable reactor, and the reagents are then heated for an appropriate length of time. Adequate time must be used to allow for crystallization of the initial amorphous gel that forms. A suitable process of preparation involves preparing an aqueous solution of sodium aluminate and sodium hydroxide and then adding with rapid agitation an aqueous solution of sodium silicate. While satisfactory crystallization may be obtained at temperatures from 20 to 175° C. the pressure being atmospheric or above, corresponding to the equilibrium of the vapor pressure with the mixture at the reaction temperature, crystallization is generally conveniently carried out at about 100° C. For temperature between 20° C. and 175° C., an increase in temperature increases the velocity of the reaction and thus decreases its duration. As soon as the zeolite crystals are completely formed they retain their structure and it is not essential to maintain the temperature of the reaction any longer in order to obtain a maximum yield of crystals.

After formation, the crystalline zeolite is separated from the mother liquor, usually by filtration or centrifugation. The crystalline mass is then washed, preferably with salt-free water, while on the filter, until the wash water, in equilibrium with the zeolite reaches a pH of 9 to 12. The crystals are then dried at a temperature between about 25° C. and 150° C. Substantially complete dehydration is obtained by calcining in air at a temperature of 350° C. or more. Use of temperatures substantially above about 525° C. should be avoided since such high temperature causes collapse of the structure and loss of sorptive properties. If desired, sub-atmospheric pressure can be used, but atmospheric pressure dehydration is preferred. It is advantageous during dehydration to sweep water vapor from the heating zone with a current of air or other gas.

In accordance with the present invention, it has been discovered that the presence in the reaction mixture leading to the formation of molecular sieve 4A of an amount of previously formed crystalline molecular sieve of the "A" series greatly enhances the rate of crystallization of molecular sieve 4A product being formed. The molecular sieve of the "A" series present in the reaction mixture may be the 4A material or such material which has undergone previous base exchange with hydrogen, ammonium, a metal of group I or II or a transition metal of the periodic table as set forth hereinabove. For example, molecular sieve 5A may be used. It has been found that the mass of crystalline 4A material produced per unit time increases as the quantity of crystalline material present in the reaction mixture increases. It has further been found that the surface area of the crystalline product is directly proportional to its mass and that the crystal size of the 4A molecular sieve product is constant and uniform.

The introduced crystalline molecular sieve may be obtained from a variety of sources including previously formed dried and calcined 4A molecular sieve material, crystals in the process of growth, or crystals which have completed their growth but are still contained in the mother liquor. A particularly convenient way of furnishing the seed crystals involves recycling a portion of the reaction product mixture containing crystalline material into the feed stream without having previously separated crystalline solid from the aqueous phase. It is thus not necessary that the crystalline 4A seed be isolated and dried prior to use. This latter finding makes possible a continuous method for synthesizing 4A molecular sieve which, in turn, affords a continuous process for producing the other various molecular sieves of the "A" series.

The quantity of crystalline 4A or other A series molecular sieve added to the reaction mixture may vary over a wide range. The use of as little as 1 weight percent of the ultimate weight of crystalline product is sufficient to seed and to markedly decrease the time required to induce conversion of the reaction mixture slurry to crystals of the "A" zeolite. While such small percentage is effective, the use of larger amounts within the approximate range of 10 to 20 percent by weight substantially decreases the time required to convert the slurry of amorphous solids to the desired crystalline form. Thus, should it be desired to manufacture the "A" crystalline zeolite in a batch type operation, the discovery that the crystallization of this specific zeolite species may be reproducibly induced by adding seed in the manner described herein and that by so doing, an advanced stage of crystallization is achieved in shorter time, results in a marked improvement in the batch-type operation. In the embodiment of the present invention concerned with continuous operation, utilizing the hereinabove described seeding technique, reproducible induction of crystallization is an essential feature. In that aspect of the invention relating to continuous operation wherein a portion of crystalline zeolite suspended in its mother liquor is recycled to the reaction mixture slurry, the amount of medium recycled may be sufficiently small so that after instantaneous mixing with the zeolite-forming constituents the externally introduced crystal content of the mixture is such that it represents 10 percent of the ultimate total crystalline product capable of forming from the mixture. However, it is advantageous and accordingly preferable to add larger portions of the medium of suspended crystalline zeolite in the mother liquor to new crystal forming constituents, generally amounts within the approximate range of 10 to 90 percent of the ultimate total crystalline product.

The advantageous use of a medium comprising crystalline zeolite suspended in its mother liquor to form new crystalline zeolite stems from the discovery of the very unusual crystallization rate characteristics of the "A" zeolite. Precisely, the rate of growth of new crystal, once a substantial amount of crystal is already present in the reaction mixture, has been found to obey a "population" growth law, best expressed as follows:

$$\log \frac{C_f}{C_i} = k\tau$$

in which $C_f$ and $C_i$ denote the degrees of conversion to crystals, in the reaction mixture slurry, or levels of crystallization, at the end and beginning, respectively, of an interval of time $\tau$. Both $C_f$ and $C_i$ are expressed as:

$$\frac{\text{Weight of crystals in a unit volume of slurry}}{\text{Weight of crystals plus weight of residual crystallizable solids in a unit volume of slurry}} \times 100$$

After mixing with new crystal forming ingredients, the level of crystallization is initially reduced in the reaction mixture to a value $C_i$. The newly formed mixture, after a residence time $\tau$ in the reactor again emerges with a concentration $C_f$. The $k$ shown above is a constant, the value of the constant being governed by the temperature and the concentration of sodium hydroxide.

Figure 1:
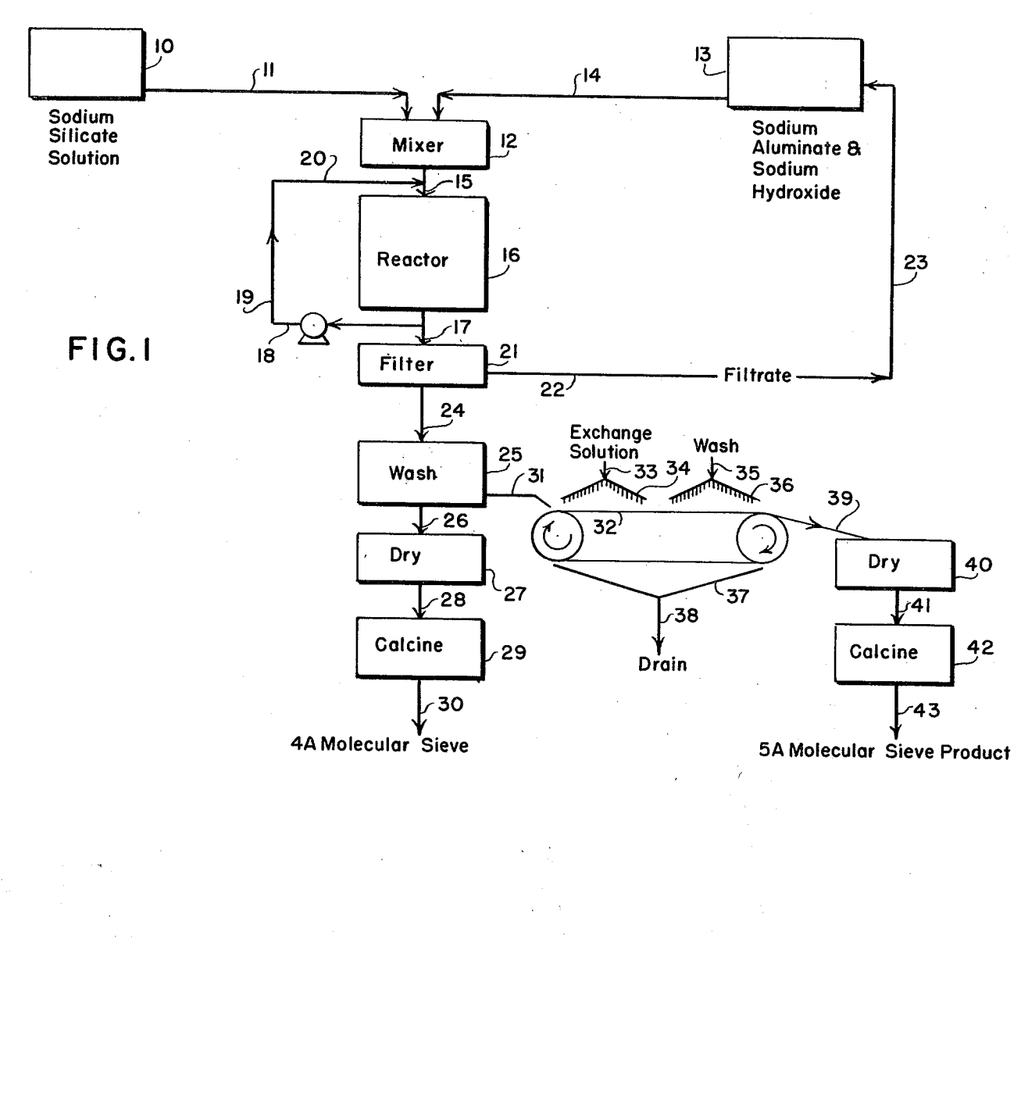

A suitable system for continuously producing molecular sieves of the "A" series is shown in FIGURE 1 of the attached drawings. Referring more particularly to such figure, aqueous sodium silicate solution is introduced from vessel 10 through line 11 to mixer 12. Sodium aluminate-sodium hydroxide solution is introduced from the vessel 13 through line 14 to mixer 12. The two solutions undergo intimate admixing in mixer 12. The product from mixing is introduced through line 15 to reactor 16 in which crystallization of sodium aluminosilicate takes place. Product passes from the reactor through line 17. A portion of the crystal-containing reaction mixture is recycled through lines 18, 19 and 20 to the reactor serving to increase the rate of crystallization taking place within the reactor. The stream of reaction product mixture passing through line 17 is conducted to a filter 21 which removes the crystalline product from the aqueous phase. The latter comprising a sodium hydroxide-sodium aluminate filtrate is withdrawn through line 22 and recycled through line 23 to vessel 13. During or after such recycling the recycled stream may be fortified with added sodium aluminate and/or sodium hydroxide. The crystalline product obtained on filter 18 may be washed on such filter or alternately conducted through line 24 to a washing zone 25 in which the crystalline product is washed free of water-soluble impurities. The washed product is then conducted through line 26 to a drying zone 27, maintained at a temperature between about 25° C. and about 150° C. The product, after drying, is conducted through line 28 to a calcining zone 29 wherein the product undergoes substantial dehydration by being subjected to a temperature in the approximate range of 350 to 525° C. The product passing from the calcining zone through line 30 is 4A molecular sieve. As an alternate to the above procedure and in the event that 5A or other molecular sieve of the "A" series is desired, the crystalline sodium aluminosilicate product passing from washing zone 25 is conducted by line 31 to an endless porous belt 32. Upon initial passage of the sodium aluminosilicate material to such belt, it is sprayed with a suitable ion exchange solution, the ion of which serves to replace all or a portion of the sodium ions of the crystalline sodium aluminosilicate product. Such exchange solution is conducted through line 33 to sprayer 34. After passage through the spraying zone, the ion exchanged product is conveyed by the endless porous belt through a washing zone. In such zone, water is conducted through line 35 and sprayer 36 which serves to effectively wash the product free of water-soluble material. The spent exchange solution and wash water are collected in pan 37 and drained through line 38 while the washed aluminosilicate material is conducted from the endless belt along platform 39 to a suitable drying zone 40. After drying, the crystalline aluminosilicate material is conducted through line 41 to a calcining zone 42. After being dehydrated in such calcining zone the molecular sieve product is withdrawn through line 43.

In the above operation, the sodium ions of the initially produced crystalline sodium aluminosilicate may be replaced partially or completely by other cations during treatment with the exchange solution. These replacing ions include other monovalent or divalent cations such as lithium and magnesium, metal ions of the first group of the periodic table such as potassium and silver, metal ions of the second group such as calcium, zinc, and strontium, metal ions of the transition metals such as nickel, cobalt and other ions such as ammonium which with the sodium zeolite of the "A" series react as metals in that they replace the sodium ions without occasioning any appreciable change in the fundamental structure of the crystalline zeolite. Replacement is suitably accomplished by spraying or otherwise contacting the crystalline sodium aluminosilicate with a solution of an ionizable compound of the ion which is to be exchanged into the molecular sieve structure. After such treatment the resulting product, as has been indicated, is water washed, dried and calcined.

Sodium zeolite of the "A" series exchanged with calcium or magnesium admits larger molecules than the unexchanged material. An unusual characteristic of the calcium or magnesium exchanged zeolites is that the opening of the pores is not accomplished progressively as the sodium ions are replaced by calcium but is produced within a fairly narrow range of composition. When the exchange is 25 percent or less, the substance possesses substantially the same pore characteristics as the sodium zeolite of the "A" series, namely a pore diameter of about 4 Angstrom units. However, when the exchange exceeds about 40 percent, the pore characteristics become those of the calcium and magnesium zeolites of the "A" series, i.e. a pore diameter of about 5 Angstrom units. Generally, the substances having a divalent exchanged ion such as zinc, nickel, and strontium zeolites have pore size characteristics analogous to those of calcium and magnesium of the "A" series. The substances having a monovalent ion such as lithium zeolite of the "A" series, on the other hand, have pore size characteristics similar to the sodium zeolite of such series.

It has further been found, in accordance with the present invention, that the overall rate of the crystallization reaction can be increased by increasing the concentration of the sodium hydroxide solution employed as the crystallization medium. It has been established that as the concentration of sodium hydroxide is increased in the crystallization medium, the speed of crystallization is enhanced. Thus, when the concentration of sodium hydroxide in the crystallization medium is below about 1 Normal NaOH the rate of crystallization is fairly slow. Very concentrated solutions of sodium hydroxide, on the other hand, i.e. of the order of 3–5 Normal NaOH require the use of caustic resistant equipment and thereby impart an economic burden on the process employing such solutions. It has been found, in accordance with the present invention, that it is particularly feasible to maintain the concentration of the sodium hydroxide solution used as the crystallization medium within the approximate range of 1.1 to 2.0 Normal NaOH.

It is generally preferred in the present process to employ soluble initial reactant materials for preparing the crystalline sodium aluminosilicate product such as for example, aqueous solutions of sodium aluminate and sodium silicate. The initial reaction product obtained upon mixing such solutions is an amorphous sodium aluminosilicate gel which, in the presence of sodium hydroxide, undergoes crystallization to the desired crystals of 4A molecular sieve. It is accordingly possible in the preparation of the crystalline sodium aluminosilicate 4A molecular sieves to prepare the amorphous sodium aluminosilicate gel, isolate and dry it and introduce the same into a sodium hydroxide solution of the preferred concentration specified hereinabove. It is essential, however, to the success of the invention that the reaction mixture from which the crystalline 4A molecular sieve material is derived have a composition expressed in terms of oxide-mole ratios falling within the ranges:

$Na_2O/SiO_2$ from 0.8 to 3.0
$SiO_2/Al_2O_3$ from 0.5 to 2.5
$H_2O/Na_2O$ from 35 to 200

It will be understood that the amount of crystalline sodium aluminosilicate introduced, in accordance with the process of this invention, into the initial reaction mixture is such as to enhance the rate of crystallization from the reaction mixture of the desired sodium aluminosilicate crystalline product. The particular amount of crystalline aluminosilicate introduced may vary widely but, in general, will be a function of design and type of particular equipment employed.

The following examples will serve to illustrate the process of the invention without limiting the same:

EXAMPLE 1

In a suitable reaction vessel was placed a mixture of 800 ml. of 1.1 Normal aqueous sodium hydroxide solution at 100° C. and 27.2 grams (dry basis) of an amorphous sodium aluminosilicate. The latter consisted of 45 mol percent silica and 27.5 mol percent each of alumina and sodium oxide. The mixture was stirred and samples were removed periodically, washed with water and purged with nitrogen at 360° C. The quantity of crystalline sodium aluminosilicate having a uniform structure made up of pores of about 4 angstroms in diameter, i.e. crystals of molecular sieve 4A, in the various samples was determined by water sorption capacity. The results are summarized below in Table I.

Table I

| Sample | Time of Sampling, Hrs. | Wt. Percent 4A in Sample |
| --- | --- | --- |
| 1 | 2.50 | 14.3 |
| 2 | 2.75 | 20.2 |
| 3 | 3.00 | 26.9 |
| 4 | 3.25 | 39.6 |
| 5 | 3.50 | 56.8 |
| 6 | 3.75 | 82.3 |
| 7 | 4.00 | 100 |

The reaction depicted by the above data is typical of a non-seeded preparation. The results are shown graphically in FIGURE 2 of the attached drawings wherein conversion of amorphous material to crystalline 4A molecular sieve is shown as a function of the time of reaction.

EXAMPLE 2

A reaction mixture was prepared in the same manner as described in Example 1. In this example, however, 27.2 grams of 4A molecular sieve was added to the sodium hydroxide solution simultaneously with the amorphous sodium aluminosilicate. This molecular sieve had been previously dehydrated by purging with nitrogen at 360° C. for 4 hours. As in Example 1, samples were removed from the mixture at various intervals and the amount of 4A molecular sieve in the solid samples, as well as the percent conversion of amorphous material to crystalline sieve, was determined. The results are shown in Table II.

Table II

| Sample | Time of Sampling, Hrs. | Wt. Percent 4A in Sample | Percent Conversion |
|---|---|---|---|
| 1 | 0 | 58.8 | 0 |
| 2 | 0.25 | 70.7 | 28.9 |
| 3 | 0.50 | 93.6 | 84.6 |
| 4 | 0.75 | 99 | 97.5 |
| 5 | 1.00 | 100 | 100 |

As in Example 1, 27.2 grams of amorphous sodium aluminosilicate were converted to 4A molecular sieve. The reaction in this example, however, required about 45 minutes for 97.5 percent conversion instead of approximately 4 hours as in Example 1. The results of this example are also shown graphically in FIGURE 2.

EXAMPLE 3

A reaction mixture was prepared in the same manner as described in Example 1. Crystals of molecular sieve 4A were allowed to grow for 3.5 hours, at which time 27.2 grams of amorphous sodium aluminosilicate were added to the reaction mixture. This time was considered to be zero-time for sampling carried out at periodic intervals. The amount of 4A molecular sieve in the solid samples, as well as the percent conversion of amorphous material to crystalline sieve, was determined and results are shown below:

Table III

| Sample | Time of Sampling, Min. | Wt. Percent 4A in Sample | Percent Conversion |
|---|---|---|---|
| 1 | −1 | 36.3 | |
| 2 | 0 | 21.0 | 0 |
| 3 | 10 | 23.5 | 3.2 |
| 4 | 20 | 28.4 | 9.4 |
| 5 | 30 | 34.0 | 16.5 |
| 6 | 40 | 45.6 | 31.2 |
| 7 | 50 | 55.9 | 44.2 |
| 8 | 60 | 70.2 | 62.3 |
| 9 | 70 | 86.0 | 82.2 |
| 10 | 80 | 98.0 | 97.5 |
| 11 | 90 | 99.6 | 99.5 |

Figure 2:
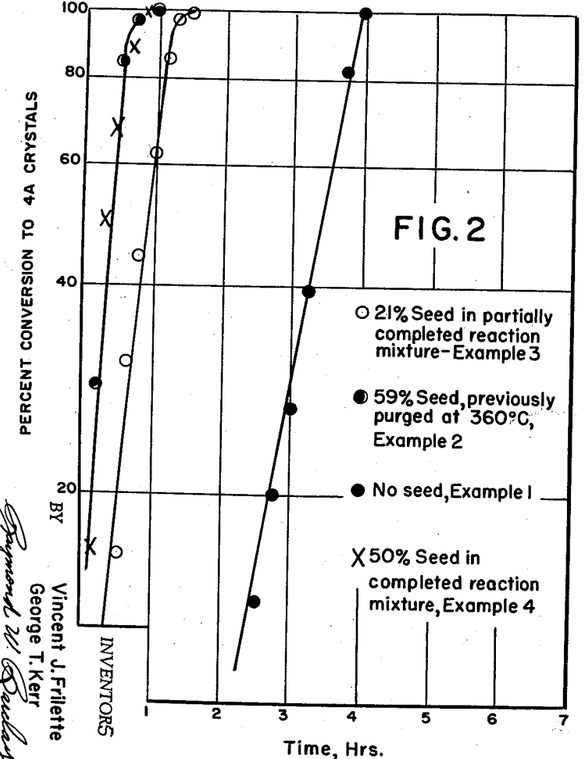

The results of this example, showing that crystals in the growth stage also serve as seed for conversion of amorphous to crystalline 4A molecular sieve are depicted graphically in FIGURE 2.

EXAMPLE 4

A reaction mixture was prepared as in Example 1. The mixture was allowed to react for 5 hours to ensure complete crystallization. At the end of this time, 27.2 grams of water-free amorphous sodium aluminosilicate was added and samples were taken from the reaction mixture as described hereinbefore. For purpose of sampling, zero-time is considered as the time of addition of the amorphous material. The amount of 4A molecular sieve and the percent conversion of amorphous material to crystalline sieve in each of the samples was determined and is set forth below:

Table IV

| Sample | Time of Sampling, Min. | Wt. Percent 4A in Sample | Percent Conversion |
|---|---|---|---|
| 1 | −1 | 100 | |
| 2 | 0 | 49.5 | 0 |
| 3 | 10 | 58.0 | 16.8 |
| 4 | 20 | 75.5 | 51.5 |
| 5 | 30 | 83.7 | 67.7 |
| 6 | 40 | 94.0 | 88.0 |
| 7 | 50 | 100 | 100 |

The above data which are also shown graphically in FIGURE 2 demonstrate that reaction mixtures which have completely reacted have the ability to serve as a seed source for conversion of amorphous solid to crystalline molecular sieve 4A without the need for separation of the solid and liquid phases of the reaction mixture.

EXAMPLE 5

Amorphous sodium aluminosilicate was prepared from sodium aluminate and sodium silicate solutions in the presence of crystals of molecular sieve 4A. For such purpose, an aqueous solution of 22.9 grams of sodium aluminate in 200 ml. of water was heated to 100° C. Then, 11.2 grams of 4A molecular sieve were added followed immediately, while stirring, with 44.7 grams of sodium metasilicate monohydrate dissolved in 200 ml. of water at 100° C. The silica/alumina ratio present was the same as in the amorphous material used in previous examples. The aqueous phase was comparable in base strength with those of the previous examples. Samples of the reaction mixture were taken at suitable intervals and analyzed for amount of 4A molecular sieve and percent conversion of amorphous material to crystalline sieve. The results obtained for each sample are shown below:

Table V

| Sample | Time of Sampling, Hrs. | Wt. Percent 4A in Sample | Percent Conversion |
|---|---|---|---|
| 1 | 0 | 47 | 0 |
| 2 | 0.25 | 51.5 | 8.5 |
| 3 | 0.50 | 61.2 | 26.8 |
| 4 | 0.75 | 78.8 | 60.0 |
| 5 | 1.00 | 93.5 | 87.7 |
| 6 | 1.25 | 100 | 100 |

Comparison of the above data with those of Example 1 demonstrates that conversion of fresh amorphous sodium aluminosilicate to crystalline 4A molecular sieve material responds to the presence of 4A seed.

EXAMPLE 6

In the same manner as described in Example 1, 45 grams of dry amorphous sodium aluminosilicate were slurried in 1600 ml. of 0.8 N sodium hydroxide solution. This amorphous material had essentially the same composition as that used in the previous examples. The percent of 4A crystalline molecular sieve in the resulting samples was determined by X-ray diffraction techniques. The results obtained are shown below:

Table VI

| Sample | Time of Sampling, Hrs. | Wt. Percent of 4A in Sample |
|---|---|---|
| 1 | 3.0 | Trace |
| 2 | 3.5 | 5 |
| 3 | 4.0 | 7 |
| 4 | 4.5 | 8 |
| 5 | 5.0 | 12 |
| 6 | 5.5 | 21 |
| 7 | 6.0 | 41 |
| 8 | 6.5 | 64 |
| 9 | 6.75 | 73 |

Figure 3:
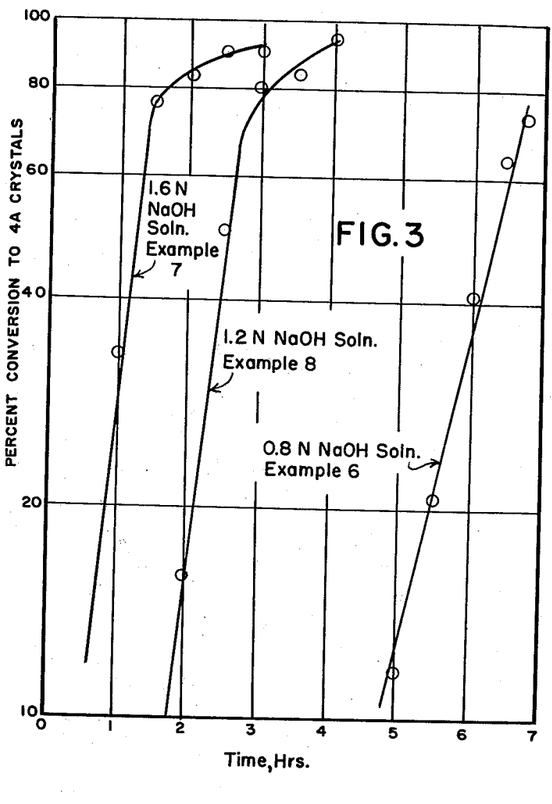

It will be seen from FIGURE 3, in which the above data are depicted graphically, that the time required for complete crystal growth is decreased as the concentration of the sodium hydroxide solution is increased.

EXAMPLE 7

In the same manner as described in Example 6, 45 grams of dry amorphous sodium aluminosilicate were slurred in 800 ml. of 1.6 N solution of sodium hydroxide. As in the previous examples, the samples were analyzed by X-ray diffraction and the results are set forth below:

*Table VII*

| Sample | Time of Sampling, Hrs. | Wt. Percent of 4A in Sample |
| --- | --- | --- |
| 1 | 0.5 | 6 |
| 2 | 1.0 | 33 |
| 3 | 1.5 | 76 |
| 4 | 2.0 | 84 |
| 5 | 2.5 | 90 |
| 6 | 3.0 | 91 |

The above data are also shown graphically in FIGURE 3.

EXAMPLE 8

In the same manner as described in Example 6, 45 grams of dry amorphous sodium aluminosilicate were slurried in 1200 ml. of 1.2 N solution of sodium hydroxide. The samples were analyzed by X-ray diffraction and the results obtained are shown in Table VIII below and in FIGURE 3.

*Table VIII*

| Sample | Time of Sampling, Hrs. | Wt. Percent 4A in Sample |
| --- | --- | --- |
| 1 | 0.5 | 0 |
| 2 | 1.0 | 6 |
| 3 | 1.5 | 8 |
| 4 | 2.0 | 16 |
| 5 | 2.5 | 50 |
| 6 | 3.0 | 80 |
| 7 | 3.5 | 84 |
| 8 | 4.0 | 94 |

EXAMPLE 9

Figure 4:
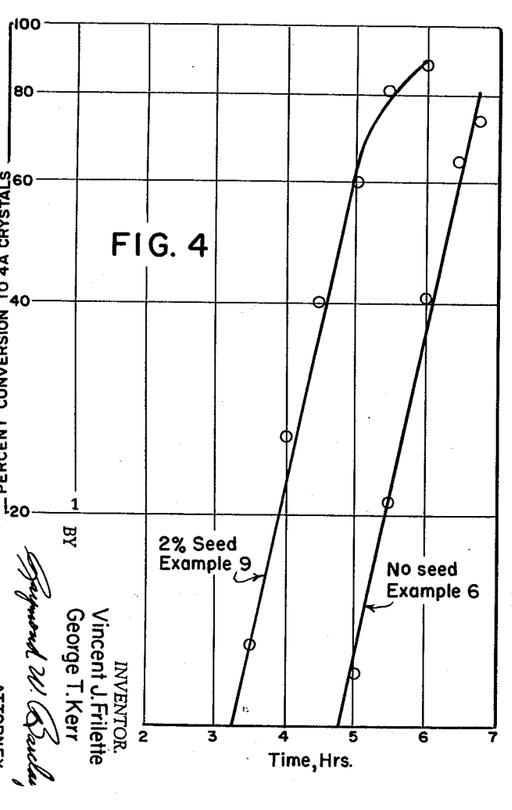

A reaction was conducted in exactly the same manner as described in Example 6 except that 0.9 gram of 4A molecular sieve was mixed with the amorphous sodium aluminosilicate material prior to mixing with the sodium hydroxide solution. This is equivalent to approximately 2 percent conversion at the start of the reaction. The various samples were analyzed by X-ray diffraction and the results are shown in Table IX below and in FIGURE 4.

*Table IX*

| Sample | Time of Sampling, Hrs. | Wt. Percent 4A in Sample | Percent Conversion |
| --- | --- | --- | --- |
| 1 | 0.5 | Trace | |
| 2 | 1.0 | Trace | |
| 3 | 1.5 | 3 | 1 |
| 4 | 2.0 | 5 | 3 |
| 5 | 2.5 | 5 | 3 |
| 6 | 3.0 | 9 | 7 |
| 7 | 3.5 | 15 | 13 |
| 8 | 4.0 | 28 | 26 |
| 9 | 4.5 | 42 | 40 |
| 10 | 5.0 | 62 | 60 |
| 11 | 5.5 | 82 | 80 |
| 12 | 6.0 | 91 | 89 |

It will be seen from the above data that the medium which contained 2 weight percent crystal was relatively unproductive, requiring 3.5 hours to produce an additional 13 percent of crystal. In contrast to this, only 0.5 hour was required to produce 13 percent crystal if 15 percent already were present.

EXAMPLE 10

A reaction was conducted in exactly the same manner as described in Example 1 except that 400 ml. instead of 800 ml. of 1.1 Normal aqueous sodium hydroxide solution were used. Samples were obtained and analyzed as previously described. The results are set forth below:

*Table X*

| Sample | Time of Sampling, Hrs. | Wt. Percent 4A in Sample |
| --- | --- | --- |
| 1 | 3.00 | 12.7 |
| 2 | 3.25 | 17.7 |
| 3 | 3.50 | 29.2 |
| 4 | 3.75 | 45.3 |
| 5 | 4.00 | 82 |
| 6 | 4.25 | 98 |

Comparison of the data of the above table with Table I shows that as the volume of the sodium hydroxide solution is decreased, the induction period for crystallization of molecular sieve 4A is increased.

EXAMPLE 11

In a suitable reaction vessel was placed a solution of 21.8 grams of sodium aluminate dissolved in 200 ml. of water. This solution was heated to boiling and a boiling solution of 109 grams of sodium metasilicate monohydrate in 320 ml. of water was added with stirring. Samples were periodically removed, filtered, washed with water and purged with nitrogen at 360° C. The weight percent of 13X molecular sieve in each of the samples was determined by cyclohexane sorption. The results obtained are shown below:

*Table XI*

| Sample | Time of Sampling, Hrs. | Wt. percent 13X in Sample |
| --- | --- | --- |
| 1 | 2.00 | 13.6 |
| 2 | 2.25 | 23.8 |
| 3 | 2.50 | 36.4 |
| 4 | 2.75 | 52.7 |
| 5 | 3.00 | 70.0 |
| 6 | 3.25 | 91.0 |
| 7 | 3.50 | 94 |

EXAMPLE 12

A reaction was conducted in exactly the same manner as described in Example 11 over a 2.5 hours period at which time 45 percent of the amorphous sodium aluminosilicate were converted to crystalline 13X molecular sieve. Then fresh solutions of sodium aluminate and sodium silicate were added to produce a fresh amorphous gel essentially equal in mass to the initial amorphous sodium aluminosilicate gel. The time of such addition was, for purposes of sampling, considered zero-time. The results obtained, upon analysis, are shown below:

*Table XII*

| Sample | Time of Sampling, Hrs. | Wt. percent 13X in Sample | Percent Conversion |
| --- | --- | --- | --- |
| 1 | 0 | 24.3 | 0 |
| 2 | .50 | 31.0 | 9.7 |
| 3 | 1.00 | 40.1 | 20.9 |
| 4 | 1.50 | 53.7 | 38.8 |
| 5 | 1.75 | 62.3 | 50.3 |
| 6 | 2.00 | 78.5 | 71.6 |
| 7 | 2.25 | 80.5 | 74 |

The above data shows that molecular sieve 13X does not respond to seeding as does the 4A molecular sieve. Moreover, it will be evident that seeding prevents complete conversion of amorphous sodium aluminosilicate to crystalline 13X. It has further been observed that seeding promotes the formation of another crystalline material, i.e. other than 13X, which results in an ultimate impure product. The process described herein accordingly is not applicable to continuous synthesis of molecular sieves of the "X" series but only applies to those aluminosilicates having the crystal structure and characteristics of molecular sieves of the "A" series.

In order to demonstrate the constancy of crystal size during the growth process, the following experiment was performed:

EXAMPLE 13

A sample of 4A molecular sieve was used as seed for the preparation of additional 4A sieve. A portion of the product from this reaction was in turn used as seed for a second preparation. Altogether, seven preparations were run, using in each case, as seed, a portion of the product from the preceding reaction. If the growth of fresh molecular sieve consisted in the uniform deposition of new crystal phase on the seed crystals, then obviously the crystals obtained from the seventh preparation should be markedly larger than the crystals used as seed in the first reaction. The ratio of seed crystals to amorphous gel used in each reaction was such that the final cubic crystals should have been ten times as long on the edge than the initial seed if seed crystals grow in the above manner. Examination of the initial and final crystals by electron microscopy failed to indicate any measurable difference in size of the crystals. The mode of crystal growth observed is accordingly unusual and unexpected. Ordinarily, as will be realized, seed crystals undergo a measurable increase in size when they foster new crystal growth.

Some general relations applicable to the embodiments of the invention wherein crystalline zeolite suspended in its mother liquor is added to the reaction mixture are hereinafter shown. In a typical plant, the volume of the reactor, i.e. 16 in FIGURE 1 may be assigned the symbol V, measured in gallons. The total rate of flow through the reactor may be designated F, measured in gallons per hour. Referring to FIGURE 1, this is also the rate of discharge passing through line 17. The rate of flow, F, is related to the basic rate law set forth hereinabove by the relationship:

$$\frac{V}{F}=\tau$$

The net output rate of the plant in pounds per hour, i.e. productivity of the portion of the stream passing through line 17 diverted to the filter 21 is given by the relationship:

$$\frac{(C_f-C_i)}{100}\times F\times S=\text{Net output rate of crystal, lbs./hr.}$$

in which S is the sum of the weights, in pounds, of the crystals plus crystallizable gel contained per gallon of slurry. In the usual plant operation, S will have the same value at the inlet 15, in the reactor 16, and in the recycle line 19. If a plant is operated so that the crystallized product is at a level of crystallization less than 100 percent, as is permissible, the net output rate of crystallized solids, as differentiated from the net output rate of crystals, becomes $$\frac{(C_f-C_i)}{C_f}\times F\times S$$

= Net output rate of crystallized solids, lbs./hr.

The advantageous use of the described medium may be illustrated from the relations shown. For a plant designed with a 1000 gallon reactor, to produce solids at a level of crystallization of 90 percent, operated with the equivalent of 1.2 N NaOH as in Example 8, $$V=1000 \text{ gals.}$$
$$k=0.97 \text{ hr.}^{-1}$$
$$C_f=90\%$$
$$S=0.31 \text{ lb./gal.}$$

Since $$F=\frac{V}{\tau} \text{ and } \tau=\frac{1}{k}\log\frac{C_f}{C_i}$$

Net output rate of crystallized solids, lbs./hr.

$$=\frac{C_f-C_i}{C_f}\times\frac{kV}{\log\frac{C_f}{C_i}}\times S=\frac{90-C_i}{90}\times\frac{300}{\log\frac{C_f}{C_i}}$$

$$=(90-C_i)\times\frac{3.33}{\log\frac{90}{C_i}}$$

Figure 5:
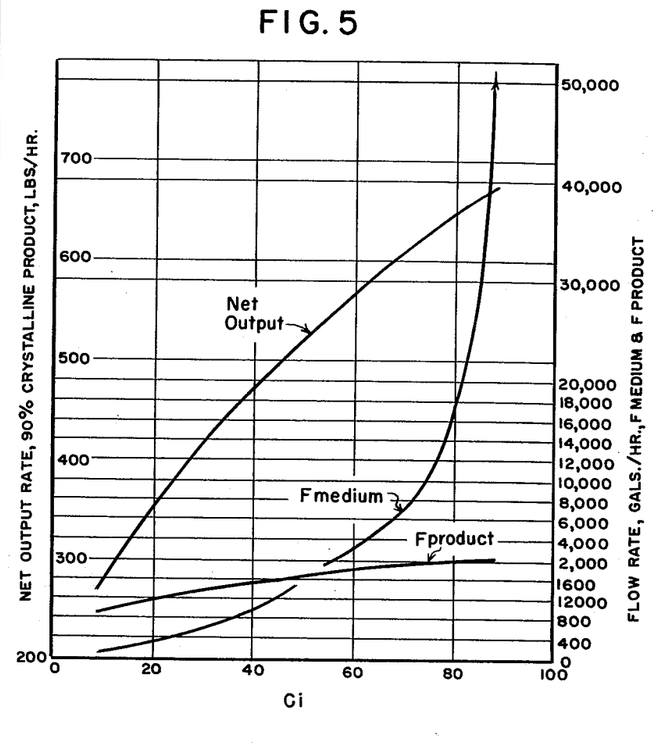

In FIGURE 5 is shown how the net output rate, i.e. that portion diverted to filter 21 of the system shown in FIGURE 1, increases with increased levels of $C_i$, obtained by recycling large amounts of the product stream which serves to supply the crystallization medium.

The flow rate of the productive portion of the exit stream 17 which goes to the filter 21 may be designated F product, and may be calculated from:

$$F_{\text{product}}, \text{gals./hr.}=\frac{\text{Net output rate of crystallized solids}}{S}$$

As can be seen from FIGURE 5, $F_{\text{product}}$ increases as the recycled medium flow rate is increased to provide larger values of $C_i$.

The recycled medium flow rate, diverted through lines 18, 19 and 20 of FIGURE 1, may be designated $F_{\text{medium}}$.

The flow rate of the recycled medium required to produce the desired $C_i$ may be computed from the following considerations:

(a) The weight of crystalline solids introduced per hour at 15 is $$F_{\text{medium}}\times S\times\frac{C_f}{100}$$

(b) The total weight of crystalline plus crystallizable solids introduced per hour at 15 is $F\times S$ (c) The resultant level of crystallization after mixing the streams introduced at 15, in percentage, is the ratio of (a) to (b) multiplied by 100; this is also the value, $C_i$.

$$\frac{F_{\text{medium}}\times S\times\frac{C_f}{100}\times 100}{F\times S}=C_i$$

or $$F_{\text{medium}}=\frac{C_i}{C_f}\times F=\frac{C_i}{C_f}\times\frac{kV}{\log\frac{C_f}{C_i}}$$

in general. For the plant operation illustrated, $$F_{\text{medium}}=C_i\times\frac{10.8}{\log\frac{90}{C_i}}$$

as shown in FIGURE 5.

Thus, the illustrated example demonstrates that crystallization in a medium comprising crystalline zeolite suspended in its mother liquor is a highly effective process, the efficiency increasing as the ratio of medium to new crystal forming constituents increases. It will, of course, be understood that the conditions may be selected to produce less than 90 percent or more than 90 percent crystallized solid product, the value 90 percent merely being shown for illustrative purposes.

It will thus be understood that the above description is merely illustrative of preferred embodiments of the

We claim:

1. A continuous method for synthesizing a solid sodium aluminosilicate molecular sieve made up of porous crystals wherein the pores of the crystals are of uniform size and have an effective pore size of about 4 Angstrom units which comprises continuously preparing a sodium oxide-silica-alumina-water reaction mixture having a composition expressed in terms of oxide-mole ratios falling within the following ranges:

$Na_2O/SiO_2$ from 0.8 to 3.0
$SiO_2/Al_2O_3$ from 0.5 to 2.5
$H_2O/Na_2O$ from 35 to 200 maintaining the mixture at a temperature within the range from 20 to 175° C. until crystals, as above defined, are formed, continuously withdrawing a portion of the resulting crystal-containing slurry, continuously introducing said withdrawn portion to a fresh supply of said reaction mixture in a quantity corresponding to at least about 10% of the ultimate total crystalline product and continuously separating crystalline product from the remainder of said crystal-containing slurry.

2. A continuous method for synthesizing a solid calcium aluminosilicate molecular sieve made up of porous crystals wherein the pores of the crystals are of uniform size and have an effective pore size of about 5 Angstrom units which comprises continuously preparing a sodium oxide-alumina-silica-water reaction mixture having a composition expressed in terms of oxide-mole ratios falling within the following ranges:

$Na_2O/SiO_2$ from 0.8 to 3.0
$SiO_2/Al_2O_3$ from 0.5 to 2.5
$H_2O/Na_2O$ from 35 to 200 maintaining the mixture at a temperature within the range from 20 to 175° C. until crystals of sodium aluminosilicate having a uniform pore structure made up of pores of about 4 Angstroms in diameter are formed, continuously withdrawing a portion of the resulting crystal-containing slurry, continuously introducing said withdrawn portion to a fresh supply of said reaction mixture in a quantity corresponding to at least about 10% of the ultimate total crystalline product, continuously separating crystals of sodium aluminosilicate from the remainder of said slurry and exchanging at least 40 percent of the sodium ions of said sodium aluminosilicate crystals with calcium to yield a calcium aluminosilicate molecular sieve product.

3. A continuous method for synthesizing a crystalline sodium aluminosilicate having a uniform structure made up of pores of about 4 Angstroms in diameter which comprises continuously introducing into a reaction zone an amorphous sodium aluminosilicate and an aqueous sodium hydroxide solution of 1.1 to 2.0 Normality, the the overall composition of the resulting mixture, expressed in terms of oxide-mole ratios, falling within the ranges:

$Na_2O/SiO_2$ from 0.8 to 3.0
$SiO_2/Al_2O_3$ from 0.5 to 2.5
$H_2O/Na_2O$ from 35 to 200 maintaining the mixture at a temperature between about 20° C. and about 175° C. until crystalline sodium aluminosilicate, as above defined, is formed, withdrawing the crystal-containing mixture from the reaction zone, recycling a portion of said crystal-containing mixture corresponding to between about 10 and about 90% of the ultimate total crystalline product to said reaction zone and separating crystalline sodium aluminosilicate product from the remainder of the crystal-containing mixture.

4. A continuous method for preparing a crystalline sodium aluminosilicate having a uniform structure made up of pores of about 4 Angstroms in diameter which comprises continuously introducing into a reaction zone a sodium oxide-silica-alumina-water reaction mixture having a composition expressed in terms of oxide-mole ratios falling within the following ranges:

$Na_2O/SiO_2$ from 0.8 to 3.0
$SiO_2/Al_2O_3$ from 0.5 to 2.5
$H_2O/Na_2O$ from 35 to 200 maintaining the mixture at a temperature within the range from 20 to 175° C. until crystalline sodium aluminosilicate, as above defined, is formed, continuously removing the crystal-containing mixture from the reaction zone, recycling to said reaction zone an amount of said crystal-containing mixture corresponding to between about 10 and about 90 percent of the ultimate total crystalline product and separating crystalline sodium aluminosilicate from the remainder of the crystal-containing mixture.

5. A continuous method for synthesizing a crystalline aluminosilicate molecular sieve characterized by pores of a uniform size and having the formula:

$$1.0 \pm 0.2 \frac{M_2O}{n} : Al_2O_3 : 1.85 \pm 0.5 SiO_2 : YH_2O$$

where M represents at least one of the materials in the group consisting of hydrogen, ammonium, metals in groups I and II of the periodic table and the transition metals of the periodic table, $n$ represents the valence of M and Y may be any value up to about 6 which comprises continuously preparing a sodium oxide-silica-alumina-water reaction mixture having a composition expressed in terms of oxide-mole ratios falling within the following ranges:

$Na_2O/SiO_2$ from 0.8 to 3.0
$SiO_2/Al_2O_3$ from 0.5 to 2.5
$H_2O/Na_2O$ from 35 to 200 maintaining the mixture at a temperature between about 20° C. and about 175° C., continuously introducing into said reaction mixture from an external source a quantity of said aluminosilicate molecular sieve corresponding to at least about 10% of the ultimate total crystalline product, continuously separating resulting crystalline aluminosilicate from the remainder of the reaction mixture and exchanging at least a portion of the sodium ions thereof with ions of M other than sodium to yield a crystalline aluminosilicate molecular sieve product as defined hereinabove.

6. A continuous method for synthesizing a crystalline aluminosilicate molecular sieve characterized by pores of a uniform size and having the formula:

$$1.0 \pm 0.2 \frac{M_2O}{n} : Al_2O_3 : 1.85 \pm 0.5 SiO_2 : YH_2O$$

where M represents at least one of the materials in the group consisting of hydrogen, ammonium, metals in groups I and II of the periodic table and the transition metals of the periodic table, $n$ represents the valence of M and Y may be any value up to about 6 which comprises continuously preparing a sodium oxide-silica-alumina-water reaction mixture having a composition expressed in terms of oxide-mole ratios falling within the following ranges:

$Na_2O/SiO_2$ from 0.8 to 3.0
$SiO_2/Al_2O_3$ from 0.5 to 2.5
$H_2O/Na_2O$ from 35 to 200 maintaining the mixture at a temperature between about 20° C. and about 175° C. until crystals of sodium aluminosilicate having the above defined composition are formed, continuously withdrawing a portion of the resulting crystal-containing slurry, continuously introducing a material selected from the group consisting of said withdrawn sodium aluminosilicate slurry and said slurry wherein at least a portion of the sodium ions thereof have been replaced by M to a fresh supply of said reaction mixture in a quantity corresponding to between about 10 and about 90% of the ultimate total crystalline product, continuously separating crystals of aluminosilicate from the remainder of said slurry and exchanging at least a portion of the sodium ions thereof with ions of M other than sodium to yield a crystalline aluminosilicate molecular sieve product as defined hereinabove.

References Cited in the file of this patent
UNITED STATES PATENTS

| | | |
|---|---|---|
| 2,882,243 | Milton | Apr. 14, 1959 |
| 2,904,607 | Mattox et al. | Sept. 15, 1959 |
| 2,958,579 | McCormick et al. | Nov. 1, 1960 |